United States Patent [19]

Shimizu et al.

[11] Patent Number: 4,542,490
[45] Date of Patent: Sep. 17, 1985

[54] RADIO - CASSETTE TAPE RECORDER/PLAYER SYSTEM

[75] Inventors: Katsuhisa Shimizu; Yoshihiro Magata, both of Saitama, Japan

[73] Assignee: Pioneer Electronic Corporation, Tokyo, Japan

[21] Appl. No.: 571,647

[22] Filed: Jan. 19, 1984

Related U.S. Application Data

[63] Continuation of Ser. No. 274,612, Jun. 17, 1981.

[30] Foreign Application Priority Data

Jun. 24, 1980 [JP] Japan .................................. 55-85424
Sep. 8, 1980 [JP] Japan .................................. 55-124247

[51] Int. Cl.⁴ .......................... H04Q 1/18; G11B 15/02
[52] U.S. Cl. ........................................ 369/6; 360/72.1; 360/74.4
[58] Field of Search ...................... 369/6–11, 369/2; 360/137, 74.4, 72.1, 61

[56] References Cited

U.S. PATENT DOCUMENTS 3,922,641 11/1975 Gates, Jr. .................................. 369/2
3,952,154 4/1976 Gates, Jr. .................................. 369/2
4,015,090 3/1977 Kitada .................................. 360/61

*Primary Examiner*—Robert L. Richardson
*Attorney, Agent, or Firm*—Sughrue, Mion, Zinn, Macpeak, and Seas

[57] ABSTRACT

A radio - cassette tape recorder/player system in which mode selection is accomplished with a single-touch operation. Function switches are provided corresponding to OFF or STOP, cassette tape recording/playing, AM radio reception, and FM radio reception. The OFF function switch operates to halt operations for both the cassette tape recording/playing mode and the AM and FM radio reception modes. An electronic control circuit operates a cassette operating mechanism and the radio receiving circuits in response to momentary actuation of the function switches.

8 Claims, 5 Drawing Figures

RADIO - CASSETTE TAPE RECORDER/PLAYER SYSTEM

This application is a continuation of application Ser. No. 274,612, filed June 17, 1981.

BACKGROUND OF THE INVENTION

The present invention relates to a radio-cassette tape recorder/player system. More particularly, the invention relates to an improved radio-cassette tape recorder/player system which can be switched from any mode to a cassette tape playing mode with a single-touch operation.

A radio-cassette tape recorder/player system of the general type to which the invention pertains incorporates both a radio receiver and a cassette tape recorder/player. The conventional radio-cassette tape recorder/player system generally incorporates independently a mode switch for selecting the radio receiver or the cassette tape recorder/reproducer. This switch must be operated before the radio receiver or the cassette tape recorder/player is played thus resulting in a two-step operation. More specifically, in case that a tape is desired to be played while an AM radio broadcast is being received by the radio receiver, the mode switch is first operated to switch the system from the radio mode to the tape mode, and thereafter the play (reproduction) switch provided in the cassette tape recorder/player section is operated. If the system is desired to be switched from this state to receive an FM radio broadcast, after the stop switch is operated, the mode switch must be switched to the radio mode after which an AM/FM switch provided in the radio receiver section must additionally be operated. Thus, a complicated operation must be used in switching between operational modes.

Accordingly, a primary object of the invention is to provide a radio-cassette tape recorder/player system which can be set to a desired mode with a single-button operation.

SUMMARY OF THE INVENTION

In accordance with this and other objects of the invention, there is provided a radio-cassette tape recorder/player system having an electronically controlled cassette operating mechanism controlled by electric signal function switches. There are provided function switches corresponding to OFF, cassette tape recording/playing, AM radio reception, and FM radio reception and the like. By an operator selecting one of these switches, change between modes is accomplished using a single-touch operation. Preferably, a cassette tape playing switch acts as a mode switch for switching into the cassette tape recording/playing mode.

The outputs of the various function switches, which may further include a fast-forward, rewind and record switches, are coupled to inputs of a latch circuit which provide a constant logic signal output in response to a momentary actuation of one of the function switches. Light-emitting diodes coupled to the outputs of the latches provide an indication of the selected mode.

DESCRIPTION OF THE PREFERRED EMBODIMENTS

A preferred embodiment of the invention will be described with reference to drawings.

Figure 1:
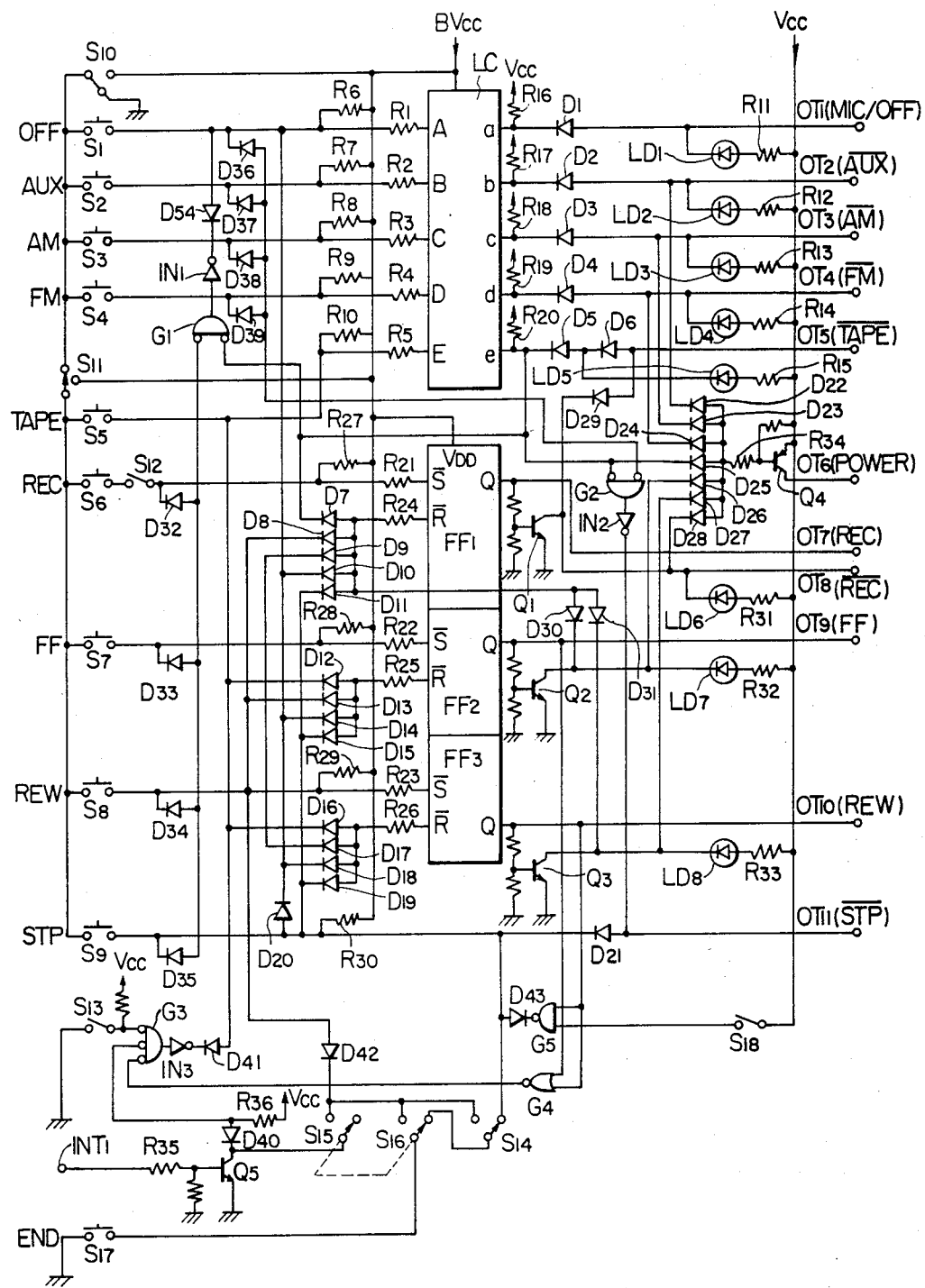
FIGS. 1 and 2 are circuit diagram showing a preferred embodiment of a control circuit used in a radio-cassette tape recorder/player system constructed according to the invention.
Figure 2:
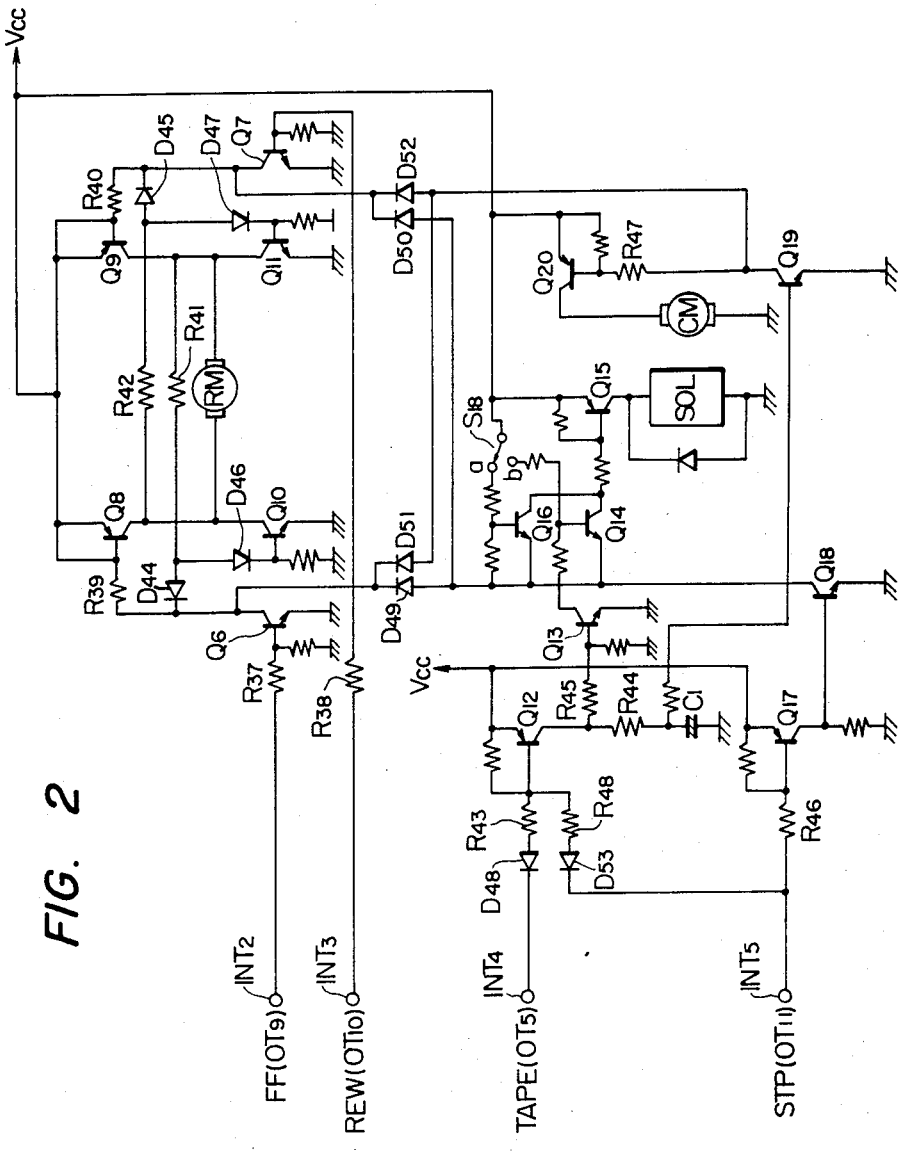

FIGS. 1 and 2 are circuit diagrams of a preferred embodiment of a function control section and a cassette tape control section used for a radio-cassette tape recorder/player system constructed according to the invention. The function control section is constructed to control the radio receiver or the cassette tape recorder/player in response to the operation of any of non-locking type "OFF" push-button switch $S_1$, auxiliary "AUX" push-button switch $S_2$, "AM" radio selecting push-button switch $S_3$, "FM" radio selecting push-button switch $S_4$, cassette "TAPE" recorder/player selecting push-button switch $S_5$, cassette tape recorder recording "REC" push-button switch $S_6$, fast forwarding "FF" push-button switch $S_7$, rewinding "REW" push-button switch $S_8$, and stopping "STP" push-button switch $S_9$. The switches $S_1$ to $S_4$ are switchably connected at first terminals thereof through a locking switch $S_{10}$ to ground or to a backup power supply terminal BVcc. The backup power supply may be a storage battery which supplies a voltage BVcc even if a power switch is turned off.

The switch $S_5$ is connected at one terminal through a cassette switch $S_{11}$ to the common terminal of the switch $S_{10}$ and is thus connected through the switch $S_{11}$ to the backup power supply terminal BVcc. The switches $S_1$ to $S_5$ are also switchably connected at second terminals thereof through respective resistors $R_1$ to $R_5$ to the input terminals A to E of a radio receiver control circuit LC. The backup voltage BVcc is also applied through pull-up resistors $R_6$ to $R_{10}$ to the connecting points of the switches $S_1$ to $S_5$ to the resistors $R_1$ to $R_5$. The radio receiver control circuit LC, which is an IC circuit, when any of the switches $S_1$ to $S_5$ is momentarily depressed to cause the corresponding input termlinal A to E of the control circuit LC to a low level "L", continuously outputs a low level "L" on the corresponding output terminal a to e. The outputs a to e from the radio receiver control circuit LC are in turn connected respectively through diodes $D_1$ to $D_5$, light-emitting diodes $LD_1$ to $LD_5$ and protective resistors $R_{11}$ to $R_{15}$ to a power supply terminal Vcc. The light-emitting diodes $LD_1$ to $LD_5$ serve to indicate operational states for "OFF" or "MIC", auxiliary "AUX", "AM" radio reception, "FM" radio reception and cassette "TAPE" recorder/player operation. The cathodes of the respective diodes $D_1$ to $D_4$ are connected to output terminals $OT_1$ to $OT_4$ of control signals for "OFF" of "MIC", auxiliary "AUX", "AM" radio reception, and "FM" radio reception. The cathode of the diode $D_5$ is connected through a diode $D_6$ to output terminal $OT_5$ for control signals for cassette "TAPE" recorder/player operation. The output terminals a to e of the control circuit LC are also connected respectively through pull-up resistors $R_{16}$ to $R_{20}$ to the power supply terminal Vcc. Further, the switches $S_5$ to $S_9$ are connected at first ends to the common terminal of the cassette switch $S_{11}$. The switch $S_6$ is connected at its second terminal through a tab detecting switch $S_{12}$, which performs an inhibit rerecording function by detection of a tab provided at a predetermined position on a cassette, and a resistor $R_{21}$ to the set input terminal $\overline{S}$ of a flip-flop $FF_1$. The switches $S_7$ and $S_8$ are respectively connected at their second terminals through resistors $R_{22}$ and $R_{23}$ to the set input terminals $\overline{S}$ of flip-flops $FF_2$ and $FF_3$.

On the other hand, the reset input terminal $\overline{R}$ of the flip-flop $FF_1$ is connected through a resistor $R_{24}$ and diodes $D_7$ to $D_{11}$ to the output terminal e of the radio receiver control circuit LC, the set input terminals $\overline{S}$ of the flip-flops $FF_2$ and $FF_3$, the output terminal of the switch $S_1$ and the output terminal of the switch $S_9$, respectively. The reset input terminal $\overline{R}$ of the flip-flop $FF_2$ is connected through a resistor $R_{25}$ diodes $D_{12}$ to $D_{15}$ to the outputs of the switches $S_5$, $S_6$, $S_1$ and $S_9$, respectively. The reset input terminal $\overline{R}$ of the flip-flop $FF_3$ is connected through a resistor $R_{26}$ and diodes $D_{16}$ to $D_{19}$ to the output terminals of the switches $S_5$, $S_7$, $S_1$ and $S_9$, respectively. The output terminal of the switch $S_9$ is connected through a diode $D_{20}$ to the input terminal A of the radio receiver control circuit LC. The backup supply terminal BVcc is applied respectively through pull-up resistors $R_{27}$ to $R_{30}$ to the connecting points of the switches $S_{12}$ and $S_7$ to $S_9$ to the resistors $R_{21}$ to $R_{23}$ and a diode $D_{21}$.

Further, the output terminals Q of the flip-flops $FF_1$ to $FF_3$ are respectively connected to output terminal $OT_7$, $OT_9$ and $OT_{10}$ for cassette tape recorder recording "REC", fast forwarding "FF", and rewinding "REW". The outputs from the outputs terminals of the flip-flops $FF_1$ to $FF_3$ are respectively applied to the bases of transistors $Q_1$ to $Q_3$, which produce inverted outputs at the respective collectors which are coupled to light-emitting diodes $LD_6$ to $LD_8$. The output of the transistor $Q_1$ is also applied to output terminal $OT_8$ for cassette tape recorder/player recording "REC". The light-emitting diodes $LD_6$ to $LD_8$ are connected in turn through corresponding protective resistors $R_{31}$ to $R_{33}$ to the power supply terminal Vcc. The output terminal of the switch $S_9$ is connected through the diode $D_{21}$ to an output terminal $OT_{11}$ used for stopping "STP".

The outputs b, c, d and e of the radio receiver control circuit LC are connected respectively through the diodes $D_2$, $D_3$ and $D_4$ to diodes $D_{22}$ to $D_{24}$ respectively and to $D_{25}$ and a resistor $R_{34}$ to the base of a transistor $Q_4$, which produces an output at the collector thereof which is connected to an output terminal $OT_6$ for "POWER". The emitter of the transistor $Q_4$ is connected to the power supply terminal Vcc. The output of the transistor $Q_1$ is applied through a diode $D_{29}$ to the output terminal $OT_5$ for cassette "TAPE" recorder/player playing. The collector outputs of the transistors $Q_2$ and $Q_3$ are applied respectively through diodes $D_{30}$ and $D_{31}$ to the reset terminal $\overline{R}$ of the flip-flop $FF_1$. The outputs from the switches $S_6$ to $S_9$ are applied to one input terminal of an AND gate $G_1$ through diodes $D_{32}$ to $D_{35}$, respectively, and the reset input of the flip-flop $F_1$ is applied to the other input terminal of the gate $G_1$, which produces an output when both the inputs thereto are identical. The output from the AND gate $G_1$ is applied through an inverter $IN_1$ and a diode $D_{54}$ to the input terminal A of the radio receiver control circuit LC. The outputs of the switches $S_1$ to $S_4$ are applied through diodes $D_{36}$ to $D_{39}$ to one input terminal of an AND gate $G_2$, and the output from the output terminal e of the radio receiver control circuit LC is applied to the other input terminal of the gate $G_2$, which produces an output when both the inputs to the input terminals of the gate $G_2$ are in the same state. The output from the AND gate $G_2$ is applied through an inverter $IC_2$ to the output terminal $OT_{11}$ corresponding to stopping "STP".

A switch $S_{13}$ operates as a program searching switch, a switch $S_{14}$ operates as a one-side tape repetition switch, switches $S_{15}$ and $S_{16}$ operate as interlocking one song repetition switches, and a switch $S_{17}$ operates as an end switch for detecting the end of the tape. An input terminal $INT_1$ receives an inter-song detection signal. The signal from the input terminal $INT_1$ is applied through a resistor $R_{35}$ to the base of a transistor $Q_5$. The power supply voltage is applied through a resistor $R_{36}$ and a diode $D_{40}$ to the collector of the transistor $Q_5$. The output from the switch $S_{13}$ is applied to one input terminal of an AND gate $G_3$, the output from the transistor $Q_5$ is applied to another input terminal of the gate $G_3$, and an output signal from a NOR gate $G_4$ to which the outputs from the flip-flops $FF_2$ and $FF_3$ are applied is applied to the other input terminal of the gate $G_3$. The gate $G_3$ produces an output when all the three inputs to the AND gate $G_3$ are in the same state.

The output from the AND gate $G_3$ is applied through an inverter $IN_3$ and a diode $D_{41}$ to the input terminal E of the radio receiver control circuit LC and through the diodes $D_{12}$ and $D_{16}$ and the resistor $R_{25}$ and $R_{16}$ to the reset input terminals $\overline{R}$ of the flip-flops $FF_2$ and $FF_3$, respectively. One of the output of the transistor $Q_3$ and the output from a switch $S_{17}$ for "END" is applied to the reset input terminals $\overline{R}$ of both of the flip-flops $FF_1$ and $FF_2$ and the set input terminal $\overline{S}$ of the flip-flop $FF_3$ through a diode $D_{42}$, depending on the settings of the switches $S_{15}$ and $S_{16}$.

A switch $S_{18}$ operates as a "MEMO" switch. The output of the switch $S_{18}$ is applied to one input terminal of an AND gate $G_5$ which the output Q from the flip-flop $FF_3$ is applied to the other input terminal of the gate $G_5$, which produces an output when both the inputs thereto are in the same state. The output from the AND gate $G_5$ is applied through a diode $D_{43}$ to the elements in the same manner as the output from the switch $S_9$ for controlling the elements. The function control section shown in FIG. 1 is thus constructed.

The construction of the cassette tape control section shown in FIG. 2 will now be described. In FIG. 2, the output terminals $OT_9$, $OT_{10}$, $OT_5$ and $OT_{11}$ shown in FIG. 1 are connected to respective input terminals $INT_2$ to $INT_5$. The signal "FF" from the input terminal $INT_2$ is applied through a resistor $R_{37}$ to the base of a transistor $Q_6$. The "REW" signal from the input terminal $INT_3$ is applied through a resistor $R_{38}$ to the base of a transistor $Q_7$. The output from the transistor $Q_6$ is applied through a resistor $R_{39}$ to the base of a transistor $Q_8$. The output from the transistor $Q_7$ is applied through a resistor $R_{40}$ to the base of a transistor $Q_9$. The power supply voltage terminal Vcc is connected through the transistor $Q_8$ to the collector of a transistor $Q_{10}$ which is connected at the emitter to ground and is also connected through the transistor $Q_9$ to the collector of a transistor $Q_{11}$ the emitter of which is grounded.

A reel motor RM is connected between the connecting point of the transistors $Q_8$ and $Q_{10}$ and the connecting point of the transistors $Q_9$ and $Q_{11}$. The output of the transistor $Q_6$ is connected through a diode $D_{44}$ and a resistor $R_{41}$ to the collector of the transistor $Q_9$, and the output of the transistor $Q_7$ is connected through a diode $D_{45}$ and a resistor $R_{42}$ to the collector of the transistor $Q_8$. The output from the transistor $Q_6$ is also connected through a diode $D_{46}$ to the base of the transistor $Q_{10}$, and the output from the transistor $Q_7$ is also connected through a diode $D_{47}$ to the base of the transistor $Q_{11}$. The signal "$\overline{\text{TAPE}}$" from the input terminal $INT_4$ is applied through a diode $D_{48}$ and a resistor $R_{43}$ to the base of a transistor $Q_{12}$. The power supply voltage terminal Vcc is connected through the transistor $Q_{12}$, a resistor $R_{44}$ and a capacitor $C_1$ to ground at the collector of the transistor $Q_{12}$.

The output from the transistor $Q_{12}$ *is applied through a resistor $R_{45}$* to the base of a transistor $Q_{13}$. The output from the transistor $Q_{13}$ is applied to a transistor $Q_{14}$ and the output from the transistor $Q_{14}$ is applied to the transistor $Q_{15}$. The outputs from the transistor $Q_6$ and $Q_7$ are applied through diodes $D_{49}$ and $D_{50}$, respectively, to the base of a transistor $Q_{16}$ so that when the latter conducts, the output from the transistor $Q_{16}$ is applied to the base of the transistor $Q_{15}$ to essentially ground the base of the transistor $Q_{15}$.

A switch $S_{18}$ operates as a head support switch and is switched to apply the power supply voltage Vcc to the base of the transistor $Q_{16}$ when the head support is forwardly positioned and to apply the voltage Vcc to the base of the transistor $Q_{14}$ when the head support is rearwardly positioned. The output of the transistor $Q_{15}$ is connected to operate a solenoid SOL and to thus move the head support to the front or to the rear.

The "STP" signal from the input terminal $INT_5$ is applied through a resistor $R_{46}$ to the base of a transistor $Q_{17}$. The output from the transistor $Q_{17}$ is applied to the base of a transistor $Q_{18}$, wherein when the latter conducts due to the output from the transistor $Q_{17}$, the emitter of the transistor $Q_{18}$ is grounded. The output from the transistor $Q_{18}$ is grounded. The output from the transistor $Q_{12}$ is applied to the base of a transistor $Q_{19}$. The output from the transistor $Q_{19}$ is applied through a resistor $R_{47}$ to the base of a transistor $Q_{20}$. The power supply voltage Vcc is applied through the transistor $Q_{20}$ to one terminal of a capstan motor CM, the other terminal of which is connected ground. The collector outputs from the transistors $Q_6$ and $Q_7$ are connected through diodes $D_{51}$ and $D_{52}$, respectively, to the collector of the transistor $Q_{19}$. The "STP" signal from the input terminal $INT_5$ is applied through a diode $D_{53}$ and a resistor $R_{48}$ to the base of the transistor $Q_{12}$.

In the circuits of the function control section and the cassette tape control section thus constructed, when the switch S for the "AM" radio reception is depressed, for example, the backup voltage BVcc applied through the pull-up resistor $R_8$ to the input terminal C of the radio receiver control circuit LC is connected through the switch $S_3$ and the locking switch $S_{10}$ to ground. As a result, the control circuit LC operates with the backup voltage BVcc and accordingly continuously holds the output terminal c corresponding to the input terminal C at a low level "L". When the output terminal c of the control circuit LC is at the "L" level, the "L" signal from the output terminal C is applied through the diode $D_3$, the diode $D_{23}$ and the resistor $R_{34}$ to the base of the transistor $Q_4$, which thus conducts and accordingly produces a power control signal from the output terminal $OT_5$, turning the power ON. When the output terminal c of the control circuit LC is at the "L" level, the light emitting diode $LD_3$ is energized to indicate the selection of the "AM" radio reception mode, and an "L" level "AM" selection signal is produced on the output terminal $OT_3$ to set the tuner section to the "AM" mode. Thus, when any one of the "AUX" switch $S_2$, the "AM" switch $S_3$ and the "FM" switch $S_4$ is depressed, the power supply is turned ON by a single touch operation, and the tuner section or the source selector section is set to the mode corresponding to the depressed switch. Accordingly, when the radio-cassette tape recorder/player system is in this state, a broadcast can be received.

If the "OFF" switch $S_1$ is then depressed, the radio receiver control circuit LC receives at the input terminal A a pulse at the "L" level whereupon the output terminal a is accordingly retained at the "L" level. Consequently, the control circuit LC produces an "L" level output signal from the output terminal $OT_L$ thereby turning the power OFF and energizing the light emitting diode $LD_1$ to indicate the deenergization of the power.

When a cassette tape is placed in the cassette receiving section of the radio-cassette tape recorder/player system, the cassette switch $S_{11}$ detects the presence of the cassette and, as shown, connects the respective terminals of the switches $S_5$ to $S_9$ through the locking switch $S_{10}$ to ground. When the "TAPE" switch $S_5$ is depressed in this mode, the radio receiver control circuit LC receives an "L" level pulse at the input terminal E and accordingly the output terminal e is set to the "L" level. When the output terminal e of the control circuit LC is at the "L" level, the "L" signal from the output terminal e is applied through the diode $D_5$, the diode $D_{25}$ and the resistor $R_{34}$ to the base of the transistor $Q_4$ which thus conducts and accordingly turns the power ON. Further, when the output terminal e of the control circuit LC is set at the "L" level, the control circuit LC energizes the light emitting diode $LD_5$ to indicate the selection of the cassette "TAPE" recorder playing mode, and produces a "$\overline{\text{TAPE}}$" signal from the output terminal $OT_5$ to the input terminal $INT_4$ shown in FIG. 2. Consequently, the "$\overline{\text{TAPE}}$" signal at the input terminal $INT_4$ energizes the transistor $Q_{12}$, and the output of the transistor $Q_{12}$ thus energizes the transistor $Q_{19}$ with a slight delay due to the time constant of the capacitor $C_1$ and the resistor $R_{44}$ connected at the collector circuit of the transistor $Q_{12}$. When the transistor $Q_{19}$ conducts, the transistor $Q_{20}$ conducts and applies the power supply voltage Vcc to the capstan motor CM which then rotates.

On the other hand, when the transistor $Q_{12}$ conducts, the transistor $Q_{13}$ is energized. When a cassette is placed in the cassette tape transport mechanism, the head support is rearwardly positioned and the head support switch $S_{18}$ is accordingly switched to the opposite side from that shown in FIG. 2 applying the power supply voltage Vcc to the base of the transistor $Q_{14}$. Accordingly, when the transistor $Q_{13}$ conducts in this state, the transistor $Q_{14}$ also conducts as well as the transistor $Q_{13}$. When the transistor $Q_{15}$ conducts, the solenoid SOL is energized to move the head support forwardly thereby causing the head face to make contact with the tape. When the head support is thus moved to the forwardmost position, the switch $S_{18}$ is accordingly switched to the position shown in FIG. 2. Thus, the transistors $Q_{14}$ and $Q_{15}$ are turned OFF. Consequently, the energization of the solenoid SOL need be carried out only for a short time. When the head support is thus positioned forwardly the head detects the signal recorded on the tape, which is transported by the capstan motor CM.

If, for example, the "STP" switch $S_9$ is depressed, the "STP" signal is applied from the output terminal $OT_{11}$ to the input terminal $INT_5$ shown in FIG. 2. As a result, the "STP" signal at the input terminal INT$_5$ energizes the transistor Q$_{17}$ and the transistor Q$_{17}$ thus energized causes the transistor Q$_{18}$ to conduct. When the transistor Q$_{17}$ conducts, the transistor Q$_{16}$ is energized to which the power supply voltage Vcc is applied through the cassette support switch S$_{18}$ to the base. When the transistor Q$_{16}$ is thus energized, the transistor Q$_{15}$ accordingly conducts energizing the solenoid SOL which moves the head support rearwardly. When the head support is thus positioned, the switch S$_{18}$ is switched to the opposite state to that shown in FIG. 2. Thus, the energization of the solenoid SOL is momentarily released in the manner described above. On the other hand, when the "STP" switch S$_9$ is depressed in the case where the output terminal e of the radio receiver control circuit LC is at the "L" level in the cassette "TAPE" recorder/player playing mode, the output of the AND gate G$_1$ changes to the "H" level and the output of the inverter IN$_1$ accordingly becomes the "L" level. As a result, when the "STP" switch S$_9$ is depressed during playing of the recorder, the power supply is deenergized in the same manner as the case where the "OFF" switch S$_1$ is depressed wherein all the circuits will be disabled.

In case that a tab is provided at the predetermined position in a cassette being played, the tab detecting switch S$_{12}$ is closed. If the "REC" switch S$_6$ is depressed in this state, the "L" signal from the switch S$_6$ sets the flip-flop FF$_1$, and the set flip-flop FF$_1$ accordingly produces on the output terminal Q and "H" output. This "H" output signal, which is outputted as the "REC" signal through the output terminal OT$_7$, is inverted through the transistor Q$_1$ and outputted as the "$\overline{\text{REC}}$" signal from the output terminal OT$_8$. This signal serves to set the recorder circuit. The "L" output signal from the transistor Q$_1$ energizes the light emitting diode LD$_6$ to indicate the recording mode. When the output of the transistor Q$_1$ thus becomes "L", the "L" signal energizes through the diode D$_{28}$ the transistor Q$_4$. Thus, the power supply is turned ON. The output of the transistor Q$_1$ is thus set to the "L" level which is coupled through the diode D$_{29}$ from the output terminal OT$_5$ as the "L" "$\overline{\text{TAPE}}$" signal to the input terminal INT$_4$ shown in FIG. 2. As a result, the cassette tape control section shown in FIG. 2 operates the drive section mechanism in the same way as in the cassette tape recorder playing mode, and the recorder thus records an input signal.

In order to prevent switching from the recording mode, the signal from the output terminal e of the radio receiver control circuit LC is applied through the diode D$_7$ to the reset input terminal $\overline{R}$ of the flip-flop FF$_1$. In this manner, the output terminal e of the radio receiver control circuit LC is always retained at the "L" level during the cassette tape recorder playing mode and the flip-flop FF$_1$ cannot be set due to the priority thereover of the reset input. The recorder cannot be set in the recording mode unless it is first set to the stop mode, thereby preventing erroneous operation of the recorder.

If the "REC" switch S$_6$ is depressed in the fast forwarding or rewinding mode, the "L" output in either case is inputted through the diodes D$_{30}$ to D$_{31}$ to the reset terminal $\overline{R}$ of the flip-flop FF$_1$ to thus prevent switching directly to the recording mode.

If the fast forward "FF" switch S$_7$ is depressed in this state, both the flip-flop FF$_1$ and FF$_3$ are forcibly reset by the "FF" signal and the flip-flop FF$_2$ is simultaneously set. Thus, the output from the flip-flop FF$_2$ is set at the "H" level. This "H" level signal is applied from the output terminal OT$_9$ as the "FF" signal to the input terminal INT$_2$ shown in FIG. 2. The "H" signal from the flip-flop FF$_2$ further energizes the transistor Q$_2$ while the output from the transistor Q$_2$ energizes in turn the light-emitting diode LD$_7$ to indicate thereby the fast forwarding mode of the cassette tape recorder. The "FF" signal thus applied to the input terminal INT$_2$ energizes the transistor Q$_6$ connected thereto. When the transistor Q$_6$ thus conducts, the output from the transistor Q$_6$ energizes the transistor Q$_{20}$ through the diode D$_{51}$. Thus, the power supply voltage Vcc is applied through the conducting transistor Q$_{20}$ to the capstan motor CM to thus drive the capstan motor CM. The output from the transistor Q$_6$ further energizes the transistor Q$_{16}$ and subsequently the transistor Q$_{15}$ through the diode D$_{49}$. The transistor Q$_{15}$ thus conducting applies the voltage Vcc to the solenoid SOL which thus moves the head support to the rear. On the other hand, when the transistor Q$_6$ conducts, the output from the transistor Q$_6$ energizes the transistor Q$_8$. When the transistor Q$_8$ thus conducts, the output from the transistor Q$_8$ is applied through the resistor R$_{42}$ and the diode D$_{47}$ to the base of the transistor Q$_{11}$, thereby, causing the transistor Q$_{11}$ to conduct. As a consequence, a current will flow in the circuit composed of the power supply (Vcc), the transistor Q$_8$, the reel motor RM, the transistor Q$_{11}$, and ground thereby causing the reel motor RM to fast forward the tape.

If the rewinding "REW" switch S$_8$ is then depressed in the stop "STP" mode, the "REW" signal from the switch S$_8$ sets the flip-flop FF$_2$ and resets the other flip-flops FF$_1$ and FF$_3$ forcibly. The output Q from the flip-flop FF$_2$ is outputted as the "REW" signal from the output terminal OT$_{10}$ which energizes the light-emitting diode LD$_8$ to indicate the "REW" mode. On the other hand, the "REW" signal at the input terminal INT$_3$ is applied through the resistor R$_{38}$ to the transistor Q$_7$ causing the transistor Q$_7$ to conduct. When the transistor Q$_7$ thus conducts, the output from the transistor Q$_7$ energizes the transistor Q$_9$. A portion of the output current from the transistor Q$_9$ is applied through the resistor R$_{41}$ and the diode D$_{46}$ to the transistor Q$_{10}$ thereby causing the transistor Q$_{10}$ to conduct. As a result, current will flow in the circuit composed of the power supply (Vcc), the transistor Q$_9$, the reel motor RM, the transistor Q$_{10}$, and ground thereby causing the reel motor RM to rotate at high speed in the direction opposite to that described before to thereby rewind the tape at high speed. In this case, the head support is always retracted in order to prevent the tape from being damaged. The output from the transistor Q$_7$ further energizes the transistor Q$_{20}$ through the diode D$_{52}$. Thus the power supply voltage Vcc is applied through the conducting transistor Q$_{20}$ to the capstan motor CM in the same manner as described with respect to the fast forwarding mode of the cassette tape recorder. The output from the transistor Q$_7$ also energizes the transistor Q$_{16}$ which in turn energizes the solenoid SOL thereby retracting the head support.

When any of the switches S$_1$ to S$_4$ for the "OFF", auxiliary "AUX", "AM" radio reception and "FM" radio reception modes is depressed in the playing or recording mode of the cassette tape recorder/player system, the output e of the radio receiver control circuit LC is already at the "L" level and is applied to the input terminal of the AND gate G$_2$ whereupon the output of the gate $G_2$ becomes the "H" level. The output from the AND gate $G_2$ is inverted by the inverter $IN_2$ to the "L" level. The "L" output from the inverter $IN_2$ is outputted as the "$\overline{STP}$" signal from the output terminal $OT_{11}$. As consequence, the cassette control section shown in FIG. 2 serves to control the cassette mechanism in the stop mode and to retain the stop mode. Thus, the cassette tape recorder/reproducer is operated in the radio receiver mode and in the cassette tape recorder mode.

The program searching and the repetition modes of the radio cassette tape recorder/player system will not be described. When the switch $S_7$ for fast forwarding "FF" or the switch $S_8$ for rewinding "REW" is depressed in the state in which the program searching switch $S_{12}$ is closed, the NOR gate $G_4$ detects the outputs from the flip-flops $FF_2$ and $F_3$ and produces the "L" signal only in the "FF"/"REW" mode. When the inter-song signal RMS representing the detection of an inter-song internal inputted to the input terminal $INT_1$, the signal PMS energizes the transistor $Q_5$. The output from the transistor $Q_5$ is applied through the diode $D_{40}$ to the AND gate $G_3$ as the "L" signal. As a consequence, all the inputs to the AND gate $G_3$ are at the "L" level, as described above, and hence the AND gate $G_3$ produces an "H" level output signal. The output signal from the AND gate $G_3$ is subsequently inverted through the inverter $IN_3$, the inverted "L" signal from the inverter $IN_3$ is applied in turn through the diode $D_{41}$ to the reset input terminals $\overline{R}$ of the flip-flops $FF_2$ and $FF_3$, and the outputs from the flip-flops $FF_2$ and $FF_3$ are reset. Since the output from the inverter $IN_3$ is further applied also to the output terminal of the cassette "TAPE" recorder/player playing switch $S_5$ and accordingly the input terminal E of the radio receiver control circuit LC, when the inter-song signal is detected as described above, the radio cassette tape recorder/player system is automatically switched from the "FF" or the "REW" mode again to the cassette "TAPE" recorder/player playing mode and the program searching control is in turn effected.

When the interlocking one song repetition switches $S_{15}$ and $S_{16}$ are switched to the position opposite to those shown in FIG. 1 and are thus set in the cassette "TAPE" recorder/player playing mode in the state in which the program searching switch $S_{12}$ is closed, the inter-song detection signal PMS from the input terminal $INT_1$ energizes the transistor $Q_5$ or closes the "END" switch $S_{17}$ at the time of completing the playing of the song. As a result, the "L" level output signal from the transistor $Q_5$ or the "END" switch $S_{17}$ is applied to set the flip-flop $FF_3$ through the interlocking one song repetition switch $S_{15}$ or $S_{15}$ and the diode $D_{42}$ as well as to reset the flip-flops $FF_1$ and $FF_2$. Accordingly, the cassette tape control section is automatically switched from the cassette "TAPE" recorder/player playing mode to the rewinding "REW" mode when the song has finished playing. Since the flip-flop $FF_3$ produces the "H" level output in the rewinding "REW" mode from the output terminal Q and the "H" output signal is applied to the NOR gate $G_4$, the NOR gate $G_4$ produces the "L" level output signal to the AND gate $G_3$. When the inter-song detection signal PMS is applied from the input terminal $INT_1$ to the transistor $Q_5$ in this state, the "L" level output signal from the transistor $Q_5$ is applied to the AND gate $G_3$ in response to the output of which program searching control operation is performed in the cassette tape control section whereupon the cassette tape recorder operates again in the cassette "TAPE" recorder/player playing mode in the same manner as described above.

When the cassette tape control section is set in the cassette "TAPE" recorder/player playing mode in the state in which only the program searching switch $S_{13}$ and the one-side repetition switch $S_{14}$ are closed and set in the opposite position to those shown in FIG. 1, the "END" switch $S_{17}$ is closed at the end of the cassette tape. As a consequence, the "L" level output from the switch $S_{17}$ sets the flip-flop $FF_2$ through the switches $S_{16}$ and $S_{14}$ as well as the diode $D_{42}$ and resets the flip-flops $FF_1$ and $FF_2$ thereby setting the cassette tape control section to the rewinding "REW" mode.

When the "END" switch $S_{17}$ is closed with the switches $S_{12}$, $S_{14}$, $S_{15}$ and $S_{16}$ set to the positions designated in FIG. 1, the "L" output from the switch $S_{17}$ resets all the flip-flops $FF_1$ to $FF_3$ through the switches $S_{10}$ and $S_{14}$ and the diode $D_{20}$ and sets the radio receiver control circuit LC in the "OFF" mode, as described above, and outputs the stop "$\overline{STP}$" signal through the diode $D_{21}$ to the output terminal $OT_{11}$.

If the cassette tape recorder is then played in the state in which the "MEMO" switch S is closed and is the thereafter set in the rewinding "REW" mode in the cassette tape control section, the switch $S_{18}$ is set to become ON when the cassette tape is rewound to the "MEMO" position. As a consequence, the "L" level output from the switch $S_{18}$ is applied to the AND gate $G_5$ and the output of the AND gate $G_5$ thus is at the "L" level output. The "L" level output signal from the AND gate $G_5$ is applied through the diode $D_{21}$ to the output terminal $OT_{11}$ in the same manner as the operation of the "END" switch $S_{17}$ as described above.

When the locking switch $S_{10}$ is switched to the position opposite to that shown in FIG. 1, the "H" level signal is applied from the backup voltage terminal BVcc to all the function switches $S_1$ to $S_{10}$. Since all the switches are thus locked, erroneous operation of the function control section is accordingly prevented. If no cassette is present in the radio-cassette tape recorder/player section, the switch $S_{11}$ is switched to the opposite position to that shown in FIG. 1, the "H" level signal is also applied from the backup voltage supply to the function switches $S_6$ to $S_9$ in the cassette tape recorder/player section, and these switches are all locked so as not to be erroneously operated.

Figure 3:
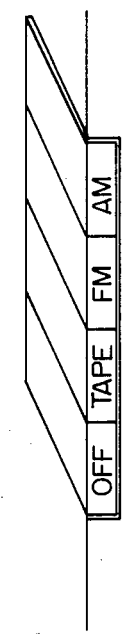
FIGS. 3 and 4 are, respectively, a perspective view and a circuit diagram of control panel switches used in a preferred embodiment of the invention.

FIG. 3 shows a perspective view of an essential part of an example of the control panel used in another preferred embodiment of the radio cassette tape recorder/reproducer of the invention. This control panel includes an "OFF" push-button switch, a "TAPE" push-button switch, an "FM" push-button switch $S_3$ and an "AM" push-button switch $S_4$ as mode switching push-button switches.

Figure 4:
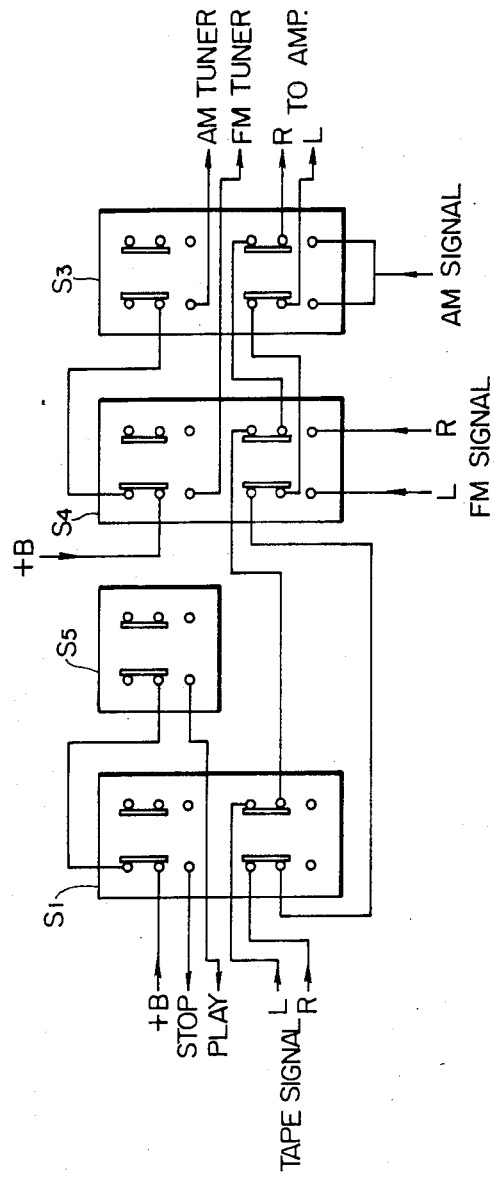

FIG. 4 shows a schematic circuit diagram of the connected state of the "OFF" switch $S_1$, the "TAPE" switch $S_5$, the "FM" switch $S_4$, and the "AM" switch $S_3$ which are cooperatively operated with the operation of the respective mode switching switches shown in FIG. 3. This control panel configuration shown in FIG. 4 incorporates features different from the conventional radio cassette tape recorder/player. Specifically, when the "TAPE" switch $S_5$ is depressed, the "TAPE" signal for controlling the electronically controlled mechanism of the cassette tape recorder/player system in the cassette "TAPE" recorder/player playing mode is outputted, and when the "OFF" switch $S_1$ is depressed, the "$\overline{STP}$" signal for stopping the electronically controlled mechanism of the cassette tape recorder/player system is produced.

If, for example, the "FM" switch S₄ is depressed in the radio cassette tape recorder/player system thus constructed, the movable contacts of the switch S₄, are switched to the opposite position to that shown in FIG. 4. As a consequence, the power supply voltage +B is applied through the movable contact of the "FM" switch S₄ to the FM tuner section to supply power to the FM tuner section. Accordingly, the FM tuner section applies right and left signals R and L detected from the received FM brodcast signal to the "FM" switch S₄. The "FM" switch S₄ applies the right and left signals R and L through the "AM" switch S₃ to an amplifier section as right and left signals R and L to which right and left speakers are connected.

When the "AM" switch S₃ is then depressed and the "AM" switch S₃ is set, the "FM" switch S₄ is reset and the movable contacts of these switches are switched to positions opposite to those shown in FIG. 4. As a result, the power supply voltage +B applied to the FM tuner section is disconnected from the FM tuner section, and the voltage +B is then applied through the "FM" switch S₄ and the "AM" switch S₃ to the AM tuner section. Accordingly, the AM tuner section receives AM broadcasts, applying an audio signal to the "AM" switch S₃. Consequently, the detected audio signal is applied through the amplifier section (not shown) as right and left signals R and L.

When the "TAPE" switch S₅ is depressed, the "AM" switch S₃ is reset, and hence the movable contacts of the "TAPE" switch S₅ are switched to the positions opposite to those shown in FIG. 4. As a consequence, the voltage +B is applied through the "OFF" switch S₁ and the "TAPE" switch S₅ as the cassette "TAPE" recorder/player playing signal to the electronically controlled mechanism of the radio cassette tape recorder/player system. Thus, the radio cassette tape recorder/player system is operated and the signals R and L reproduced from the tape are applied through the "OFF" switch S₁ the "FM" switch S₄ and the "AM" switch S₃ to the amplifier section.

If the "OFF" switch is then depressed, the "TAPE" switch S₅ is reset, and the "OFF" switch S₁ is switched to the position opposite that shown in FIG. 4. As a consequence, the voltage +B is applied through the "OFF" switch S₁ to the electronically controlled mechanism of the cassette tape recorder/player as the "STP" signal. Accordingly, the cassette tape recorder/player is switched to the stopped state immediately upon depression of the "OFF" switch S₁.

It should be understood from the foregoing description that since in the radio cassette tape recorder/player system of the invention mode switching push-button switches are connected to operate the "TAPE" mode switch and to switch directly from any mode to the "TAPE" mode in an automatic manner and also that all the operations can be halted merely by depressing the stop "STP" mode switch, a desired mode can be selected directly without any intermediate operation thus providing a much simpler operation than was attainable with prior art arrangements.

Figure 5:
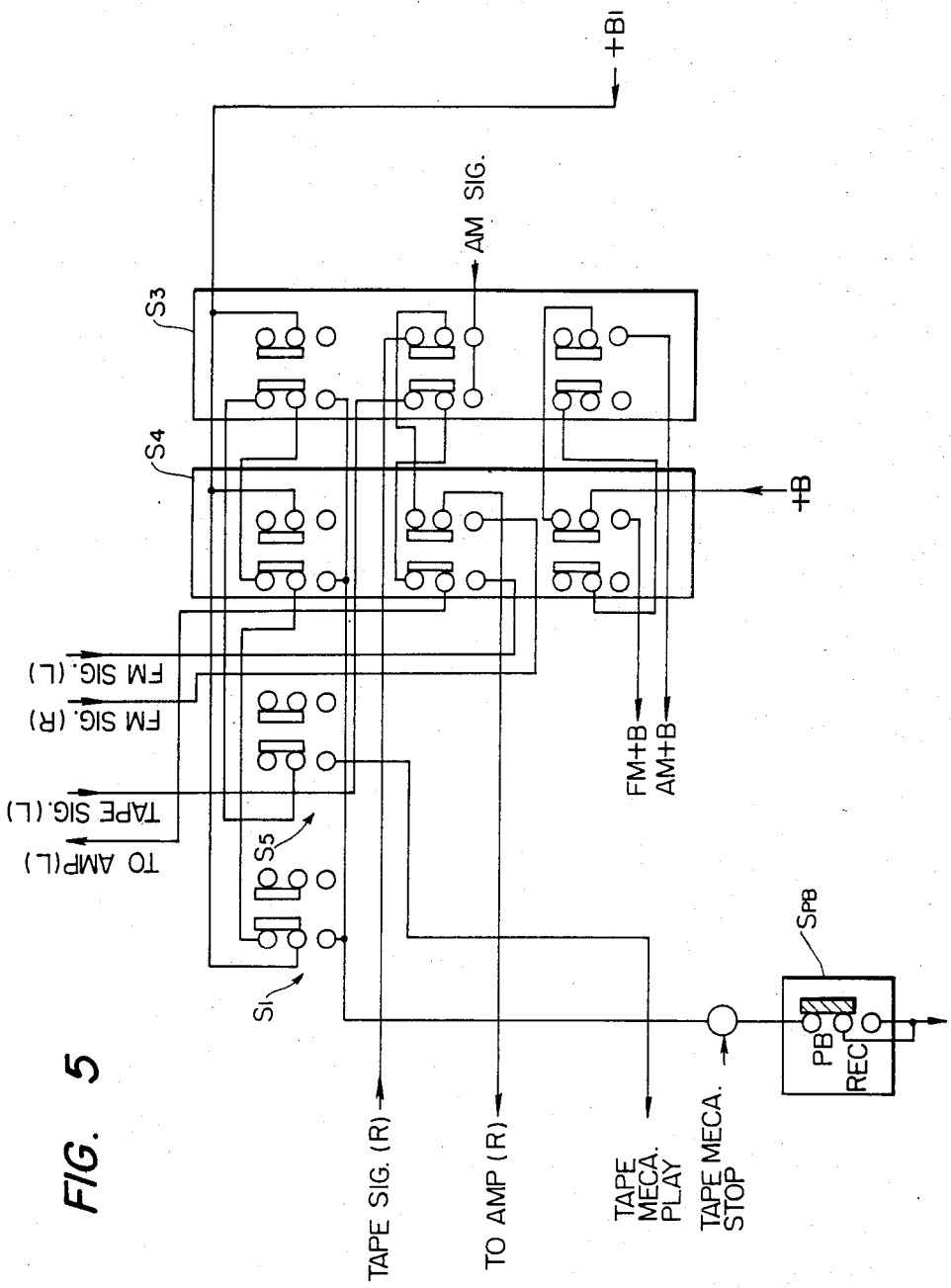
FIG. 5 is a circuit diagram showing a further example of the switch connections.

FIG. 5 is a circuit diagram showing a further example of the switch connections. According to this example, when either the AM or FM button is depressed from the tape reproducing mode, the tape reproducing mechanism is controlled to stop the reproducing operation of the tape due to the provision of a switch S_{PB}. The switch S_{PB} is closed when the tape mode is in the playback mode but is open when the tape mode is in recording mode. It should be noted that the tape recording operation is not stopped when the mode is changed to either the AM or FM receiving mode.

What is claimed is:

1. A radio-cassette tape recorder/player system, comprising; a plurality of switches for effecting at least a cassette tape recording function, a cassette tape playing function, an AM reception function and an FM reception function, respectively;
    an electrical logic circuit coupled to said switches for controlling the function of said system in response to the switch selected;
    at least an AM tuner, an FM tuner and a cassette operating mechanism, each being controlled by said electrical logic circuit;
    said electrical logic circuit including means for controlling said cassette operating mechanism such that at least said cassette tape playing function is directly achieved upon the actuation of only a corresponding one of said switches, regardless of the then effected one of said functions, whereby at least cassette playing may be achieved through the operation of a single switch when switching from others of said functions.

2. A system as claimed in claim 1, wherein said electrical logic circuit includes flip-flop means, and said plurality of switches further includes a stop switch for effecting a cassette tape STOP function, said flip-flop means operating to prevent said cassette operation mechanism from initiating said cassette tape recording function unless said stop switch has been previously actuated.

3. A system as claimed in claim 2, wherein said electrical logic circuit includes means enabling switching from others of said functions directly to one of said AM reception function or FM reception function, in response to the actuation of a single corresponding switch therefor.

4. A system as claimed in claim 3, wherein said electrical logic circuit includes means for controlling said cassette operating mechanism so as to direct the latter to achieve said cassette tape STOP function when one of cassette tape playing and cassette tape recording comprises the function effected prior to said switching of functions.

5. The radio-cassette tape recorder/player system of claim 2, further comprising switch means coupled to said electrical logic circuit for sensing an inter-song interval, and wherein said electrical logic circuit comprises means for operating said cassette operating mechanism in response thereto to perform a song-repeat operation.

6. The radio-cassette tape recorder/player system of claim 1, said electrical logic circuit comprising storing means operating in response to said cassette tape recording, said cassette tape playing AM radio reception, and FM radio reception function switches for storing a digital bit in response to momentary actuation of said function switches.

7. The radio-cassette tape recorder/player system of claim 6, further comprising a plurality of tape mode function switches including a fast-forward switch and a rewind switch, each of said fast-forward switch and said rewind switch being coupled to a corresponding input of said storing means.

8. The radio-cassette tape recorder/player system of claim 6, further comprising switch means coupled to said electrical logic circuit for sensing an end of a cassette tape being played, said electrical logic circuit operating to set said cassette operating mechanism in a stopped state in response to said switch sensing said end of said cassette being played.

* * * * *